US009626782B2

(12) United States Patent
Kitsunai

(10) Patent No.: US 9,626,782 B2
(45) Date of Patent: Apr. 18, 2017

(54) IMAGE PROCESSING APPARATUS, IMAGE PROCESSING METHOD AND COMPUTER-READABLE STORAGE MEDIUM

(71) Applicant: CANON KABUSHIKI KAISHA, Tokyo (JP)

(72) Inventor: Takahiro Kitsunai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 14/297,374

(22) Filed: Jun. 5, 2014

(65) Prior Publication Data
US 2014/0362103 A1     Dec. 11, 2014

(30) Foreign Application Priority Data

Jun. 7, 2013  (JP) ................................. 2013-120968
Apr. 17, 2014  (JP) ................................. 2014-085612

(51) Int. Cl.
  *G06T 11/60*  (2006.01)
  *G06T 5/00*  (2006.01)
  *H04N 1/00*  (2006.01)
  *H04N 1/21*  (2006.01)
  (Continued)

(52) U.S. Cl.
  CPC ............ *G06T 11/60* (2013.01); *G06T 11/001* (2013.01); *H04N 1/00456* (2013.01); *H04N 1/2108* (2013.01); *H04N 1/32144* (2013.01); *H04N 2201/325* (2013.01); *H04N 2201/3245* (2013.01); *H04N 2201/3271* (2013.01); *H04N 2201/3273* (2013.01)

(58) Field of Classification Search
  CPC ......... H04N 2201/325; H04N 1/00167; H04N 2201/3252; G06F 3/14; G06T 11/60; G06T 7/403
  See application file for complete search history.

(56) References Cited

U.S. PATENT DOCUMENTS

| 7,424,171 B2 | 9/2008 | Matsuzaka |
| 2005/0174449 A1* | 8/2005 | Matsuzaka .............. G06T 7/403 348/240.3 |
| 2005/0175260 A1 | 8/2005 | Takahashi |
| | | (Continued) |

OTHER PUBLICATIONS

Schewe, Jeff, and Bruce Fraser. Real World Camera Raw with Adobe Photoshop CS5. Peachpit, 2010. Print.*

*Primary Examiner* — Gregory J Tryder
*Assistant Examiner* — Scott E Sonners
(74) *Attorney, Agent, or Firm* — Canon USA, Inc. I.P. Division

(57) ABSTRACT

This invention can develop a part of RAW image data and display the developed part of RAW image data with a result of processing, even if the part of the RAW image data refers to other part of the RAW image data.

An image processing apparatus obtains an output area of RAW image data to be displayed on a window and a reference area of RAW image data to be pasted to the output area of the RAW image data. The apparatus develops the output area of the RAW image data and the reference area of the RAW image data. Then, the apparatus pastes a development result of the reference area of the RAW image data on a development result of the output area of the RAW image data. After that, the apparatus executes display processing to the development result of the output area of the RAW image data.

8 Claims, 6 Drawing Sheets

(51) Int. Cl.
*H04N 1/32* (2006.01)
*G06T 11/00* (2006.01)

(56) References Cited

U.S. PATENT DOCUMENTS

2006/0170704 A1* 8/2006 Kotani .................... G06T 11/60
 345/619
2008/0205794 A1 8/2008 Bhatt
2010/0277508 A1 11/2010 Takahashi

* cited by examiner

IMAGE PROCESSING APPARATUS, IMAGE PROCESSING METHOD AND COMPUTER-READABLE STORAGE MEDIUM

BACKGROUND OF THE INVENTION

Field of the Invention

The present invention relates to an image processing apparatus, image processing method and computer-readable storage medium for developing RAW image data and displaying a result of the development of the RAW image data.

Description of the Related Art

An image capturing apparatus, for example a digital camera, obtains image data by using a image sensor and stores the image data in a recording medium. The image data stored in the recording medium is non-processing basically, and only lossless compression process is applied by a case. Such non-development processing image data is generally called RAW image data. The capturing apparatus or a personal computer (PC) executes process of developing a RAW image data based on the settings of luminance, hue and so on. Then the resultant data is coded based on JPEG-Beseline and is stored as a file in a recording medium.

When the image capturing apparatus and the PC execute process of developing the RAW image data, it is necessary to execute pixel interpolation process or white balance process based on information of the light source at the time of capturing image, luminance adjustment process, hue adjustment process and sharpness process.

Moreover, the development processing must be executed for each pixel of the RAW image data. Because the RAW image data captured by lately digital cameras includes more than million pixels, it takes much time to obtain the result of a development processing after it is started. Besides, the development processing tends to be more complicated in order to obtain high quality image. And a number of pixels of the RAW image data is getting more in future. So, it is necessary to be speeding up both the development processing and displaying a result of it.

Therefore, a techniques of a prior art (U.S. Pat. No. 7,424,171) extracts trimming area to be displayed on a window based on window size and enlargement ratio. Next the techniques execute process of developing not all of the RAW image data but the trimming area of the RAW image data. According to the prior art, the number of pixels to be executed the development process is reduced, it takes less time to complete the development processing and the result of the development processing of the RAW image data is displayed on the window quickly.

By the way, it is possible to edit image, such that you can erase dust spots in an image or add preferable object to an image, by copying a part of image (a copy source image) and pasting the copy source image into another part of image (a copy destination image).

However, the techniques of the prior art executes process of developing only the trimming area. If the copy source image is not included in the trimming area, the copy source image is not executed the development process to. So, if the trimming area includes the copy destination image, it displays the trimming area without pasting the copy source image corresponding to the copy destination image. Therefore, we have a problem that it does not display a proper image which indicates a result of processing, in a case that it executes process of pasting another image into the image to be displayed.

SUMMARY OF THE INVENTION

A purpose of the present invention that it displays a proper image which indicates a result of processing to refer another part of the image, if it executes process of developing only a part of the image.

The present invention has been made in consideration of the above problems. In order to achieve the above object, an image processing apparatus according to the present invention has, for example, the following arrangement.

There is provided an image processing apparatus comprising:

a first obtaining unit configured to obtain an output area of RAW image data to be displayed on a window;

a second obtaining unit configured to obtain a reference area of RAW image data to be pasted to the output area of the RAW image data;

a developing unit configured to develop the output area of the RAW image data and the reference area of the RAW image data, using development parameter;

a pasting unit configured to paste a development result of the reference area of the RAW image data on a development result of the output area of the RAW image data; and a display processing unit configured to execute display processing to the development result of the output area of the RAW image data which the development result of the reference area of the RAW image data was pasted on.

DESCRIPTION OF THE EMBODIMENTS

The embodiments of the present invention will be described in detail below with reference to the accompanying drawings.

<First Embodiment>

Figure 1:
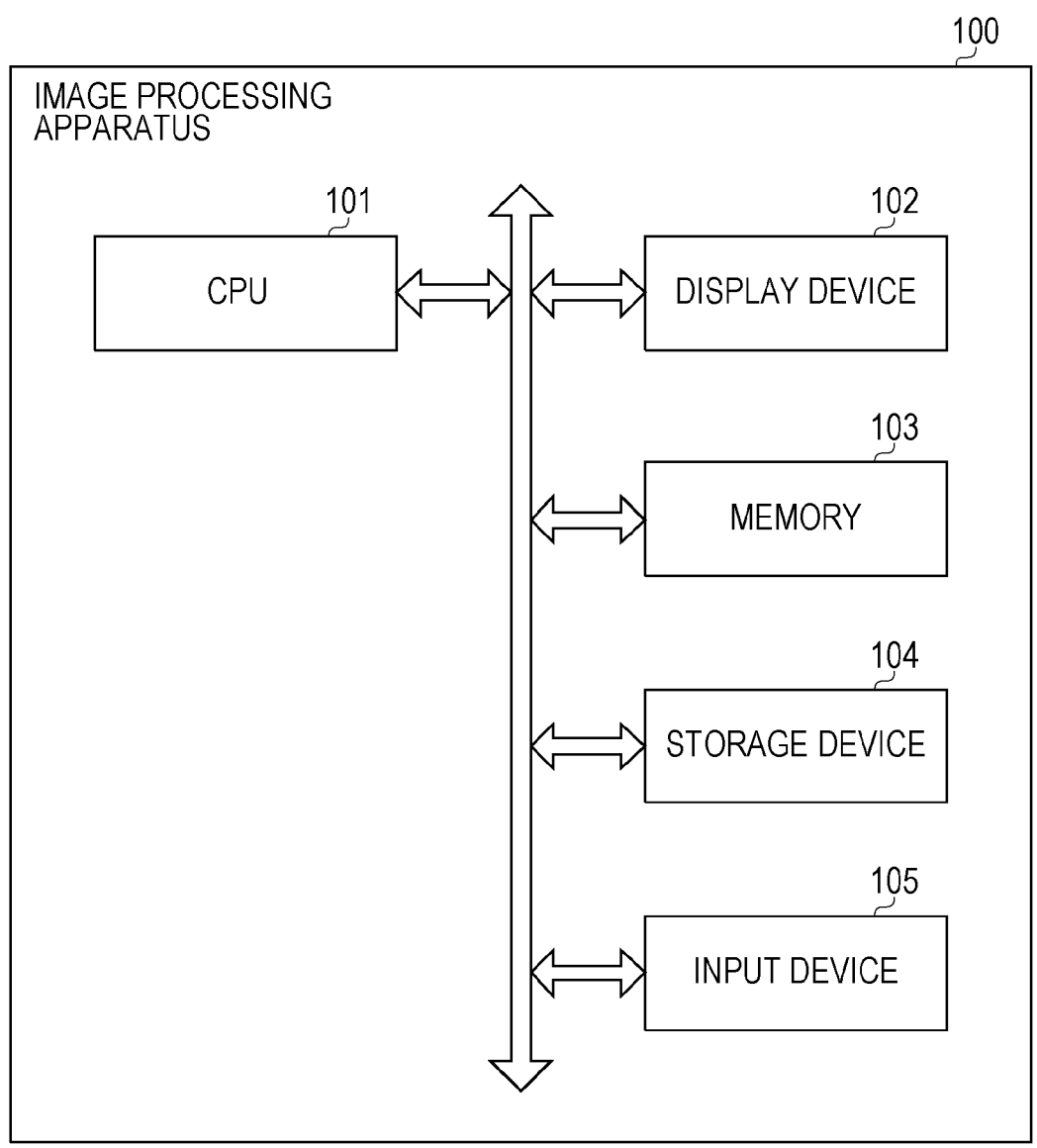
FIG. 1 is a block diagram showing the hardware arrangement of an image processing apparatus.

FIG. 1 is a block diagram showing the hardware arrangement of an image processing apparatus.

CPU 101 reads Operating System (OS) or a development process program from a storage device 104, copies them to a memory 103 and executes them. The CPU 101 can control a whole of the image processing apparatus and execute various processes.

For example, for the storage device 104, a hard disk is used. For example, for the memory 103, a RAM is used. In addition, the OS and the programs may be stored in a non-volatile memory, e.g., a ROM, instead of the storage device 104.

The storage device 104 stores RAW image data and development parameter setting. The RAW image data stored in the storage device 104 is captured by a digital camera. Also, the development parameter setting includes image quality parameters which decide quality of the image (e.g., digital gain, white balance, sharpness and brightness). And the development parameter setting includes coordinate information indicating a position of a part of the RAW image data (copy source image) designated by a user and a position of a spot of the RAW image data (copy destination image) pasted the copy source image on.

For example, for a display device 102, a liquid crystal display or CRT is used.

For example, for an input device 105, a keyboard or a pointing device is used, when an operator of the information processing apparatus operates it. The image generated by executing a process of developing the RAW image data read from the storage device is displayed on the display device 102.

When the CPU 101 executes steps based on programs stored in the storage device 104, the functions of the image processing apparatus and the processes according to later flowchart are realized.

The image processing apparatus 100 is capable of executing a plurality of image processing modes. This embodiment shows the copy stamp mode and normal display mode as an example.

(The Copy Stamp Mode)

For example, the image processing apparatus 100 executes the copy stamp mode in order to erase dust spots in the image or to add an object to the image.

Figure 2A:
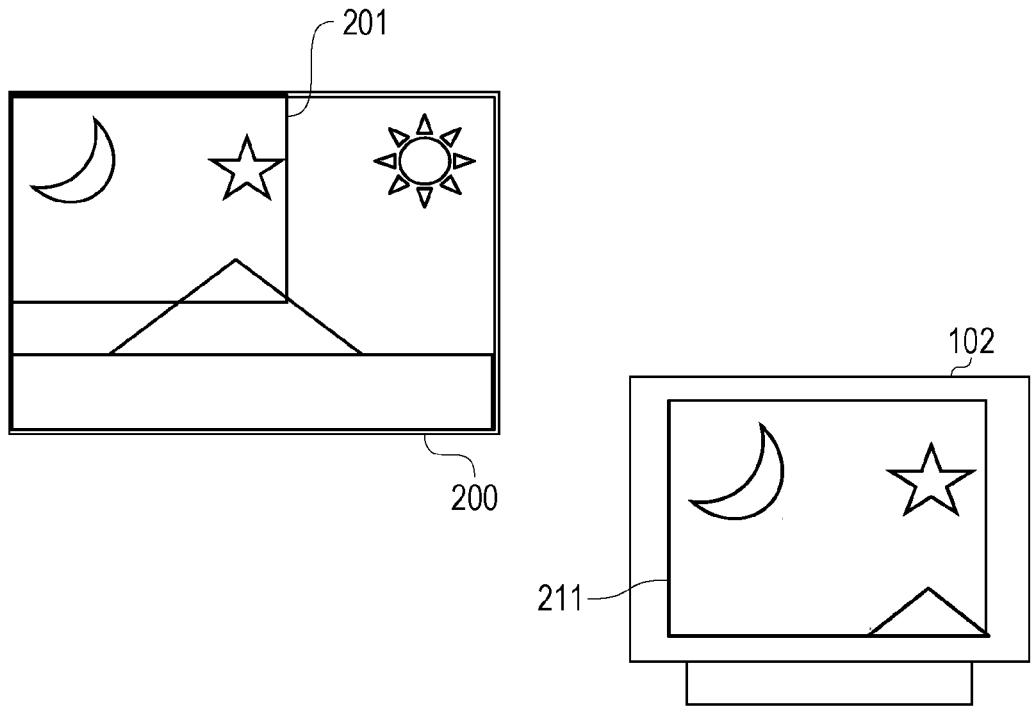
FIGS. 2A to 2B are views showing a process of pasting.
Figure 2B:
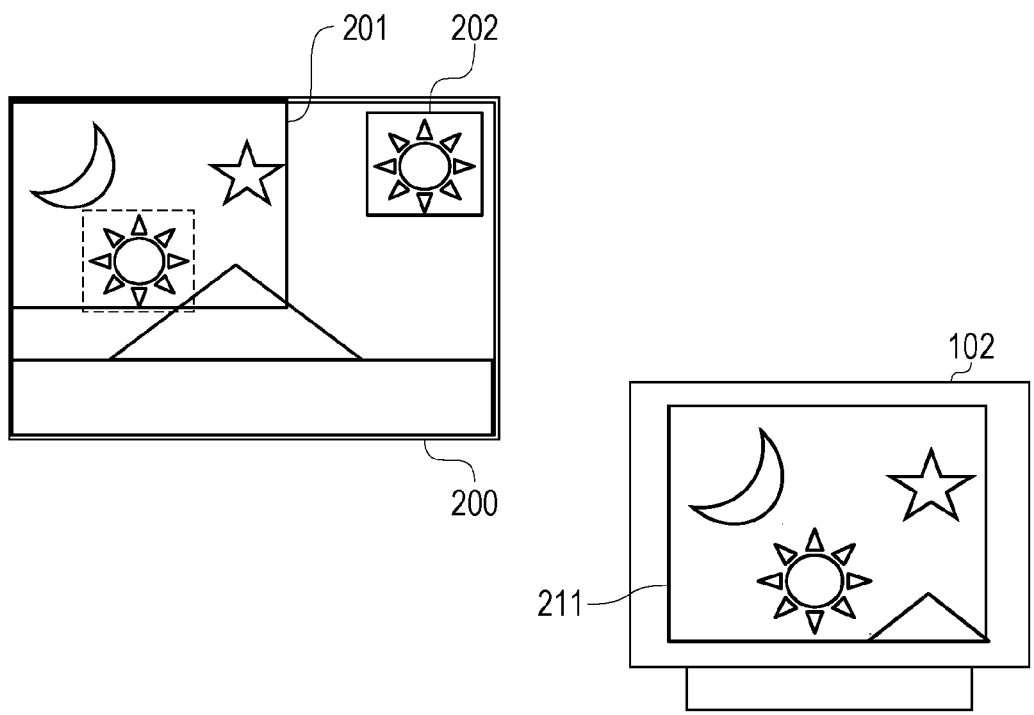

FIG. 2A to 2B are views showing a process of pasting a partial image.

FIG. 2A is views showing before executing the process of pasting a partial image. A partial image 201 (output area) of a image 200 is displayed on a display window 211 of an edit screen on the display device 200. Next, FIG. 2B is views showing after executing the process of pasting a partial image. On the display window 211 of the edit screen, a partial image 202 (copy source image) that exists out of the output area 201 in the image 200 is copied, pasted on the output area 201 and displayed.

The following explains operation of the image processing apparatus 100 in the copy stamp mode.

First, the CPU 100 displays thumbnail images corresponding to the RAW image data stored in the storage device 104 on a main window as a list. In response to a user operation, the CPU 101 selects one among the displayed thumbnail images. The CPU 101 reads the RAW image data corresponding to the selected thumbnail image from the storage device 104 to the memory 103. The CPU 101 obtains development parameter setting from the storage device 104. Also, the CPU 101 obtains development parameter setting from input device 105, the development parameter setting input by a user input operation. The CPU 101 executes process of developing all area of the RAW image data based on the image quality parameters of the development parameter setting.

The CPU 101 obtains a display coordinate indicating a position of the RAW image data corresponding to upper left of the display window of the edit screen. The CPU 101 obtains a display size indicating height and width of the display window in the edit screen. And the CPU 101 obtains enlargement ratio. The CPU 101 calculates an output area of the RAW image data. So, image size indicating a height and width of the output area is calculated by dividing the display size into the enlargement ratio. The display coordinate may indicate, as an initial value, the upper left of the RAW image data or other position. And, for example, the enlargement ratio is 100%, one pixel of the RAW image data is depicted corresponding to one pixel of the screen at the time. In other words, this is called actual pixel size.

The CPU 101 executes process of displaying the development result of the output area of the RAW image data extracted from the development result of entire the RAW image data for displaying the development result of the output area of the RAW image data on the edit screen. Concretely, the CPU 101 resizes the development result of the output area based on the enlargement ratio, generates output image data and displays it on the edit screen. Therefore, a part of RAW image data is displayed magnificently on the edit screen.

After that, in response to a user's operation, the output area to be displayed on the edit screen is possible to change. When the CPU 101 received a instruction to change the output area, the CPU 101 executes the process of displaying the development result of the changed output area of the RAW image data extracted from the development result of all of the RAW image data.

Next, in response to a user's operation, the CPU 101 selects a copy source image (a reference image part) in a first output area.

Then, after the CPU 101 moves the output area, in response to another user's operation, designates a copy destination image (a pasting spot). After that, the CPU 101 copies the development result of a reference area of the RAW image data extracted from the development result of the entire RAW image data and pastes it on the pasting spot. At this time, the CPU 101 stores coordinate information indicating a position of the reference area and a position of the pasting spot into the development parameter setting of the RAW image data. So, the CPU 101 displays a second output area on the edit screen, the copy source image of the first output area pasted on the copy destination spot of the second output area.

In addition, the embodiment above, explained that the coordinate information is stored in the development parameter setting. However, the coordinate information has only to be stored related to the RAW image data. Therefore, the CPU 101 may store separately the coordinate information related to the RAW data.

In the copy stamp mode, in case that the copy destination image and the copy source image are not in the same output area, it is necessary to switch the first output area of the copy source image and the second output area of the copy destination area quickly and display each of them.

Also, in the copy stamp mode, an appearance which indicated the copy source image pasted on the copy destination image is displayed. So, the CPU 101 needs the development result of the copy source image as well as the development result of the output area of the copy destination image, even if only the development result of the output area of the copy destination image is displayed.

For that reason, in the copy stamp mode, although what is displayed on the edit screen is not the entire RAW image data but only a part of the RAW image data such as the output area, the CPU 101 executes the process of developing the entire RAW image. Because the time of the process of developing the entire RAW image data is more than that of the process of developing only a part of the RAW image data, it takes more time until the output image data is displayed on the edit screen to start with.

In addition, the development result of the entire RAW image data is deleted, when the image processing apparatus quits the copy stamp mode or reselects the RAW image data.

(The Normal Display Mode)

For example, when a user checks an appearance of the taken image, the image processing apparatus executes the normal display mode.

Figure 4:
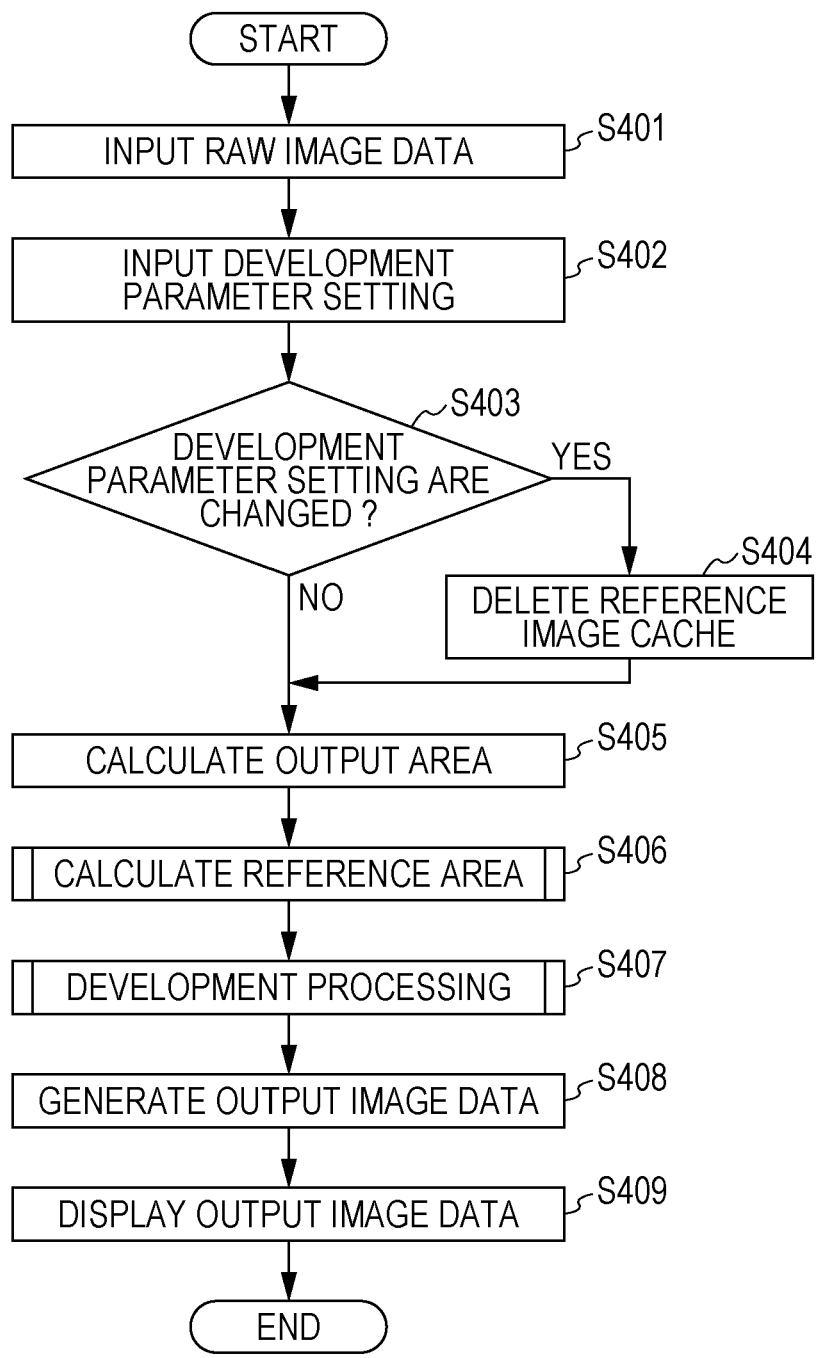
FIG. 4 is a flowchart showing the steps of information processing.

FIG. 4 is a flowchart showing operation of the image processing apparatus 100 in the normal display mode.

Now, the CPU 101 displays thumbnail images corresponding to the RAW image data stored in the storage device 104 on a main window as a list. In response to a user operation, the CPU 101 starts the normal display mode, when one of the thumbnail images is selected and an enlargement ratio is designated.

In step S401, the CPU 101 reads the RAW image data corresponding to the selected thumbnail image from the storage device 104 to the memory 103.

In step S402, the CPU 101 obtains the development parameter setting and stores them in the memory 103, in response to a user's operation.

In step S403, the CPU 101 checks whether image quality parameters of the development parameter setting are changed.

In case that the image quality parameters are changed, the CPU 101 deletes the reference image cache, in step S404.

In step S405, the CPU 101 calculates an output area of the RAW image data based on information related to the edit screen, in the same way of the copy stamp mode, and stores it in the memory 103. Now, the information related to the edit screen includes e.g., display coordinate, display size, enlargement ratio.

In step S406, the CPU 101 calculates a reference area based on the coordinate information stored in the memory 103 and related to both of the output area and the development parameter setting.

In step S407, the CPU 101 executes process of developing the output area of the RAW image data and the reference area of the RAW image data by using the image quality parameters.

In step S408, the CPU 101 executes process of pasting the development result of the reference area of the RAW image data on the development result of the of the output area of the RAW image data. Then, the CPU 101 executes process of displaying a result of the process of pasting. Concretely, the CPU 101 resizes the development result of the output image area based on the enlargement ratio, generates output image data and stores it in the memory 103.

In step S409, the CPU 101 displays the output image data on the edit screen. That is, an appearance which indicated the result of development of the reference area pasted on the result of development of the output area is enlarged and displayed.

After that, in response to a user operation, the output area of the RAW image data is possible to move. The CPU 101 executes processes of steps following step S402, if the CPU 101 received an instruction to move the output area. In addition, in step S405, in response to user's operation, the output area is decided based on a position designated, the display coordinate of the edit screen, display size, the enlargement ratio and so on.

Namely, in the normal display mode, the CPU 101 executes process of developing only the output area of the RAW image data and the reference area of the RAW image data. Because the time of the process of developing only these parts of the RAW image data is less than that of the process of developing the entire RAW image data, it takes less time until the output image data is displayed on the edit screen to start with.

Furthermore, after the output image data is displayed in step S409, in response to a user's operation, if another thumbnail image is selected in the main window, the CPU 101 reads the RAW image data corresponding to the thumbnail image selected newly from the storage device 104 in step S401. And the CPU 101 executes processes of steps following step S402, to the RAW image data. Now, if the reference area of the RAW image data is able to paste on other RAW image data, the CPU 101 does not delete the reference image cache.

<Second Embodiment>

Figure 5:
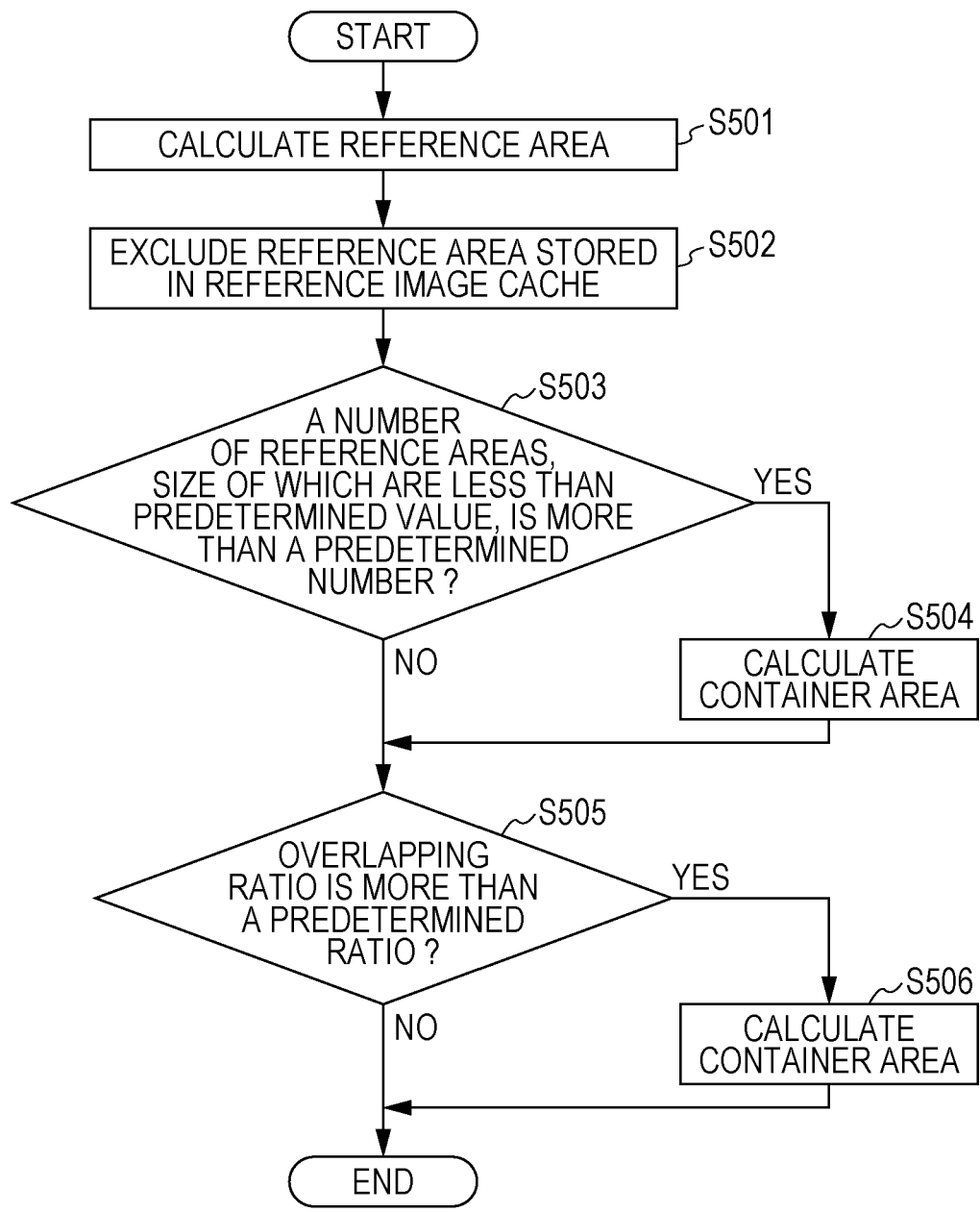
FIG. 5 is a flowchart showing the steps of process of calculating a reference area.

FIG. 5 is showing another embodiment of step S406. In step S501, the CPU 101 obtains coordinate information from development parameter setting, calculates a reference area in output area, and stores it in the memory 103. In addition, the CPU 101 checks whether the reference area exists based on a result of the calculation. If the reference area does not exist, the CPU 101 quits processes.

In step S502, the CPU 101 checks whether the result of development corresponding to the reference area stored in the memory 103 has been stored in a reference image cache. If the result of development corresponding to the reference area stored in the memory 103 has been stored in the reference image cache, the CPU 101 deletes the reference area from the memory 103.

In step S503, the CPU 101 checks whether a number of the reference areas, size of which are below predetermined value (e.g., 32×32 pixels), is more than a predetermined number (e.g., 10). Now, the CPU 101 can change the predetermined value of the area size or the predetermined number of the reference areas, in response to a user's operation arbitrary.

Figure 3:
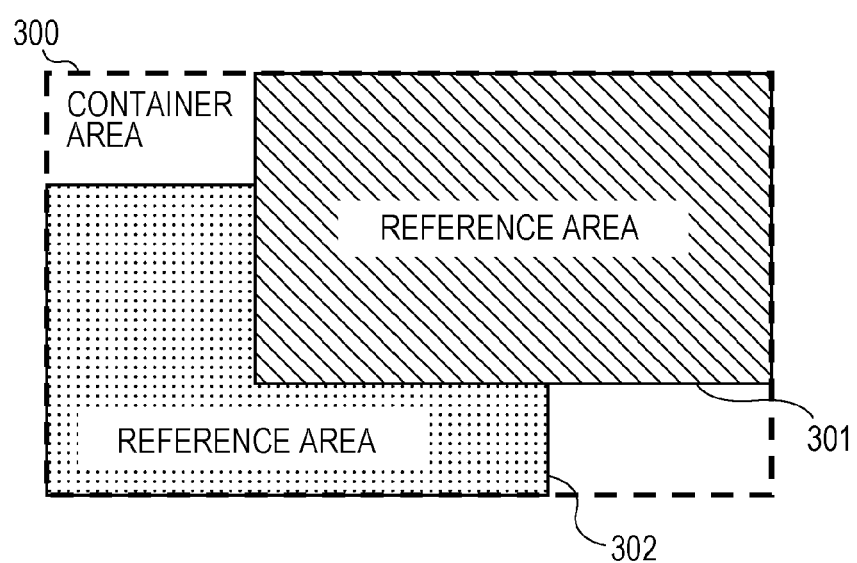
FIG. 3 is a views showing an assembly area.

If the number of the reference areas is more than the predetermined value, the CPU 101 executes process of step S504. In step S504, the CPU 101 calculates an area (a container area) containing the reference areas, size of which are less than predetermined value and stores it. And, CPU 101 deletes the reference areas, size of which is less than the predetermined value, from the memory 103. FIG. 3 is showing the container area. The container area 300 is a rectangular circumscribed to the reference area 301 and the reference area 302.

In step S505, the CPU 101 calculates overlapping ratio between the reference areas stored in the memory 103, and checks whether the overlapping ratio is more than a predetermined ratio. Now, the CPU 101 calculates area of overlapping between the reference areas and calculates the ratios of the overlapping area to each of the reference areas. And the CPU 101 selects larger ratio of the overlapping area to each of the reference areas as the overlapping ratio.

If the overlapping ratio is more than a predetermined ratio, the CPU 101 calculates the area (the container area) containing the reference areas which overlap each other, in step S506, and stores it in memory 103. Also, the CPU 101 deletes the reference areas which overlap each other from the memory 103. Now, the CPU 101 can change the predetermined ratio stored in the memory 103, in response to a user's operation arbitrary.

In this way, efficiency of management of reference areas is improved by integrating a plurality of reference areas.

<Third Embodiment>

Figure 6:
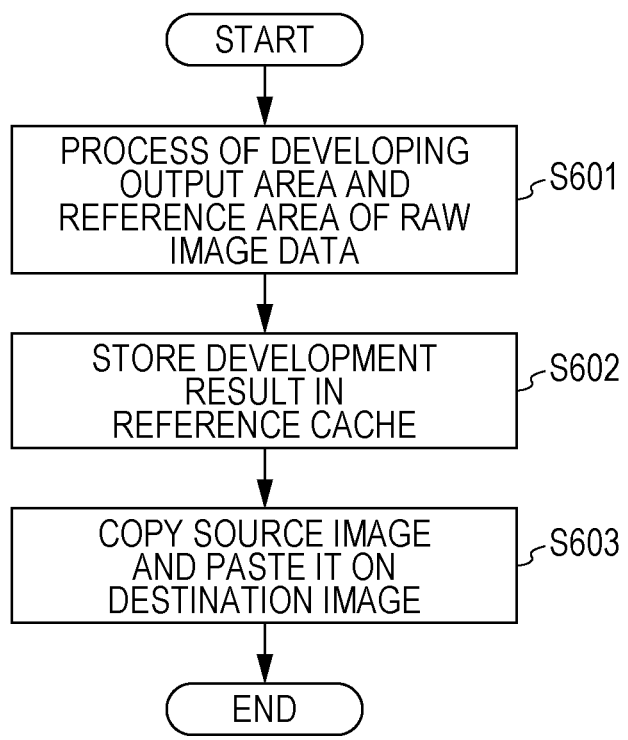
FIG. 6 is a flowchart showing the steps of process of developing RAW image data.

FIG. 6 is showing another embodiment of step S407.

In step S601, the CPU 101 executes process of developing the output area of the RAW image data and the reference area of the RAW image data by using image quality parameters of the development parameter setting. In addition, if the container area has been stored in memory 103 as the reference area, the CPU 101 executes the process of developing the container area of the RAW image data. Also, the CPU 103 does not execute the process of developing the reference area of the RAW image data stored in the reference image cache, the CPU image data obtains the development result of that from the reference image cache.

In step S602, the CPU 101 stored a result of the development of step S601 in the reference image cache. In reference image cache, the development result is stored in relation with coordinate information indicating a position of the reference area of the RAW image data. Storing the development result relating with identical information indicating the position of the RAW image data allows the CPU 101 to reuse the result of the information. So, the CPU 101 can reduce load of the process of developing.

In step S603, the CPU 101 copies the development result of the reference area based on the copy source image included in the coordinate information of the development parameter setting. Then the CPU 101 pastes it on the copy destination based on a position of the copy destination image included in the coordinate information of the development parameter setting. And the CPU 101 stores the development result of the output area of the RAW image data after the copy and paste processing in the memory 103.

In this way, the CPU 101 executes process of developing the output area and the reference area of the RAW image data. Therefore, the CPU 101 reduces load of development processing and displays the development result quickly. Furthermore, the CPU 101 can display a proper image which indicates a result of copy and paste processing.

<Other Embodiments>

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-120968, filed Jun. 7, 2013, and 2014-085612, filed Apr. 17, 2014 which are hereby incorporated by reference herein in their entirety.

What is claimed is:

1. An image processing apparatus comprising:
a processor; and
a memory storing a program which, when executed by the processor, causes the image processing apparatus to:
obtain an output area of RAW image data to be displayed on a display means;
obtain a reference area of the RAW image data, which reference area is to be pasted to the output area of the RAW image data;
develop the output area of the RAW image data and the reference area of the RAW image data, using development parameters, but not to develop an area that is neither the output area nor the reference area of the RAW image data, wherein the development parameter indicates at least one of digital gain, white balance, sharpness and brightness;
paste a development result of the reference area of the RAW image data on a development result of the output area of the RAW image data;
execute display processing of the development result of the output area of the RAW image data on which the development result of the reference area of the RAW image data was pasted; and
obtain, as the reference area, an assembly area including a plurality of reference areas, if a total number of the reference areas which each have an area below a predetermined value is more than a predetermined number.

2. An apparatus according to claim 1, wherein in a copy stamp mode, the program when executed by the processor causes the apparatus to:
develop all area of the RAW image data, using the development parameter,
execute the display processing on a part of the developed RAW image data corresponding to the output area of the RAW image data,
select, on first part of the developed RAW image data, the reference area of the RAW image data, in response to a user operation;
designate, on second part of the developed RAW image data, a spot on which the reference area of the developed RAW image data is pasted, in response to a user operation; and
store coordinate information indicating a position of the reference area of the RAW image data and the spot of the RAW image data,
wherein said pasting process based on the coordinate information is executed.

3. An apparatus according to claim 2,
wherein the first part of the developed image is different from the second part of the developed image.

4. An apparatus according to claim 1, wherein the program when executed by the processor further causes the apparatus to:
delete the developed RAW image data when the RAW image data to be displayed are replaced.

5. An apparatus according to claim 1, wherein the program when executed by the processor further causes the apparatus to:
calculate an overlapping area between reference areas of the RAW image data, and
obtain, as the reference area, an assembly area including a plurality of reference areas which overlap each other and of which area of the overlapping area is more than a predetermined ratio.

6. An apparatus according to claim 1, wherein the program when executed by the processor further causes the apparatus to:
hold the development result of the RAW image data; and
erase the development result of the RAW image data, when the development parameter is changed, wherein the development result of the RAW image data held is used for display processing, when the development parameter is not changed.

7. A method of controlling an image processing apparatus, the method comprising the steps of:
- obtaining an output area of RAW image data to be displayed on a display means;
- obtaining a reference area of the RAW image data, which reference area is to be pasted to the output area of the RAW image data;
- developing the output area of the RAW image data and the reference area of the RAW image data, using development parameters, but not to develop an area that is neither the output area nor the reference area of the RAW image data, wherein the development parameter indicates at least one of digital gain, white balance, sharpness and brightness;
- pasting a development result of the reference area of the RAW image data on a development result of the output area of the RAW image data;
- executing display processing of the development result of the output area of the RAW image data on which the development result of the reference area of the RAW image data was pasted; and
- obtaining, as the reference area, an assembly area including a plurality of reference areas, if a total number of the reference areas of which each have an area below a predetermined value is more than a predetermined number.

8. A non-transitory computer-readable storage medium storing a computer program to execute the method, the method comprising the steps of:
- obtaining an output area of RAW image data to be displayed on a display means;
- obtaining a reference area of RAW image data, which reference area is to be pasted to the output area of the RAW image data;
- developing the output area of the RAW image data and the reference area of the RAW image data, using development parameters, but not to develop an area that is neither the output area nor the reference area of the RAW image data, wherein the development parameter indicates at least one of digital gain, white balance, sharpness and brightness;
- pasting a development result of the reference area of the RAW image data on a development result of the output area of the RAW image data;
- executing display processing of the development result of the output area of the RAW image data on which the development result of the reference area of the RAW image data was pasted; and
- obtaining, as the reference area, an assembly area including a plurality of reference areas, if a total number of the reference areas which each have an area below a predetermined value is more than a predetermined number.

* * * * *